United States Patent [19]
Spohn, Jr.

[11] 3,923,086
[45] Dec. 2, 1975

[54] ADJUSTABLE RADIAL ARM APPARATUS FOR USE WITH A ROUTER OR THE LIKE

[76] Inventor: Daniel M. Spohn, Jr., 8451 Miller Road, Swartz Creek, Mich. 48473

[22] Filed: Feb. 25, 1974

[21] Appl. No.: 445,321

[52] U.S. Cl............. 144/134 B; 90/20.5; 83/471.3; 408/237
[51] Int. Cl.² ...................... B27C 5/02; B23C 1/12
[58] Field of Search ......... 83/471.3, 471.2; 90/20.5; 144/134 B, 92; 408/237, 236

[56] References Cited
UNITED STATES PATENTS

| | | | |
|---|---|---|---|
| 2,590,093 | 3/1952 | Duerr................................. | 83/471.3 |
| 2,773,524 | 12/1956 | Schutz et al......................... | 144/134 B |
| 2,852,050 | 9/1958 | Horstmann et al............. | 144/134 B |

*Primary Examiner*—Donald R. Schran
*Attorney, Agent, or Firm*—Gifford, Chandler & Sheridan

[57] ABSTRACT

An adjustable radial arm or frame apparatus for use with a cutting tool, such as a router, for selectively positioning the cutting tool, which is associated with the free or distal end of the radial arm of the apparatus in one embodiment and with a cross member in another embodiment, over a workpiece so that a great variety of forms may be cut in the workpiece. The apparatus provides two groups of motions, each of which permits the movement of the cutting tool in an infinite number of pathways from one point in a sphere to a second point in the sphere.

12 Claims, 6 Drawing Figures

ADJUSTABLE RADIAL ARM APPARATUS FOR USE WITH A ROUTER OR THE LIKE

BACKGROUND OF THE INVENTION

1. Field of the Invention

The present invention relates to machine elements and mechanisms, particularly to such mechanisms for adjustably positioning and holding a cutting tool, or the like, against a workpiece.

2. Description of the Prior Art

There are prior known devices for holding a cutting tool against a workpiece which are adjustable to position the tool at a predetermined location relative to the workpiece. However, the prior known devices provide a limited amount of adjustment of the position of the cutting tool and are complicated, thus, making them expensive to manufacture and maintain. There exists a need for a device for holding a cutting tool against a workpiece, which device provides three degrees of freedom of the cutting tool, and is simple in construction so that it is relatively easy to use and inexpensive to manufacture and maintain.

SUMMARY OF THE INVENTION

The present invention in one embodiment provides a relatively inexpensive, simple, adjustable radial arm apparatus for positioning a cutting tool, such as a router, against a workpiece. In the second embodiment of the present invention an adjustable frame is provided. In each embodiment the apparatus provides the cutting tool with three degrees of freedom, i.e., three independent coordinates would be needed to specify the position of the router, which allows for a great variety of types or forms of cuts which can be made.

The first embodiment of the apparatus of the present invention includes a vertically disposed column to which a telescopic radial arm is adjustably mounted. A cross slide is selectively movably connected at the free or proximal end of the radial arm by means of a cross slide pivot head which is selectively pivotal about an axis perpendicular to the radial arm. The cross slide is movable in a linear direction perpendicular to the pivotal axis of the cross slide pivot head. The cutting tool, such as a router, is interconnected to the cross slide by means of a rotatable head which is selectively rotatable about an axis substantially perpendicular to the cross slide. The cutting tool is mounted to the rotatable head by a swivel slide block which provides for selective movement of the cutting tool, independent of the rotational movement of the rotatable head, in a direction substantially parallel to the axis of rotation of the rotatable head and pivotal movement about an axis substantially perpendicular to the axis of rotation of the rotatable head. The apparatus also includes locking means for locking the various components of the radial arm apparatus in their respective selected positions and stops to limit the travel of its various components.

The apparatus of the present invention also includes a locating rod which is disposed through an aperture coincidental with the pivotal axis of the cross slide pivot head to aid in accurately locating the cutting tool over a particular preselected point on the workpiece.

Thus, the cutting tool, together with the cross slide pivot head, has a linear vertical movement, a linear horizontal movement, a vertical plane rotational movement, and a horizontal plane angular movement derived from corresponding movements of the radial arm and parts thereof. Further, the cutting tool, together with the cross slide, has an additional rotational movement and an additional linear movement. This first group of movements, accumulatively provides an infinite number of pathways from a first point in an imaginary sphere surrounding the cutting tool to a second point in the sphere. These pathways can be linear, or arcuate, or combinations of both. Thus the cutting edge of the tool, for example, could be inserted linearly into a cavity in the workpiece and then rotated to extend into a transverse channel within the body of the workpiece.

Further, the cutting tool, together with the rotatable head, has an additional linear movement and an additional rotational movement; and even further, and together with the swivel slide block, has a linear movement perpendicular to the linear movement of the rotatable head and has a rotational movement in a plane perpendicular to the plane of the rotational movement of the rotatable head. Thus this second group of movements accumlatively provides for any movement within a sphere.

I have found that this provision for two groups of movements each providing an infinite number of pathways between two points in a sphere offers a very versatile and sensitive control of the cutting operations by an operator.

The second embodiment of the present invention achieves these two groups of movement by use of a frame member with a longitudinally movable cross piece. The router or the like is mounted to a rotatable head which in turn is slidingly mounted to the cross piece.

BRIEF DESCRIPTION OF THE DRAWINGS

A better understanding of the present invention will be achieved upon reference to the accompanying specification and by reference to the following drawings wherein like numerals refer to like parts throughout the several views, and in which.

DETAILED DESCRIPTION OF THE PREFERRED EMBODIMENT

Figure 1:
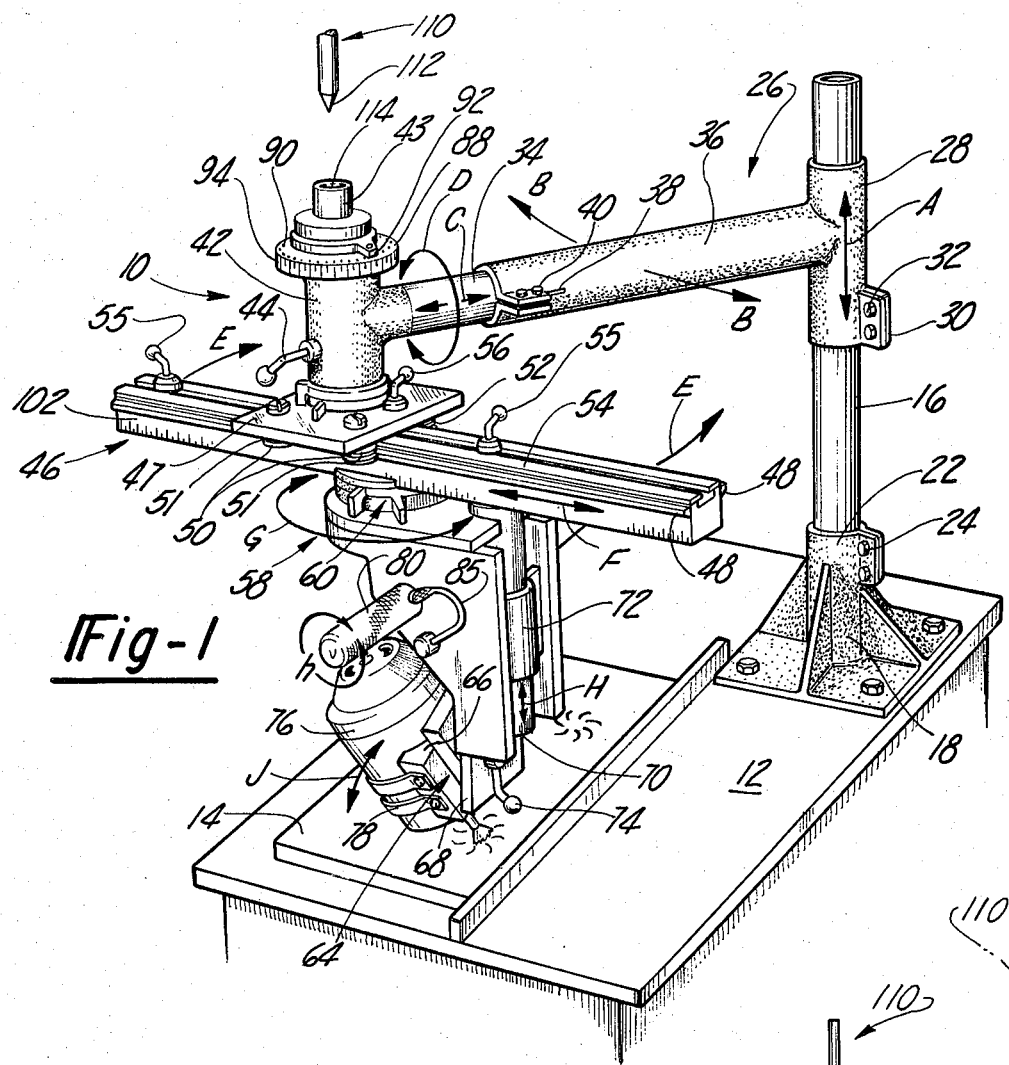
FIG. 1 is a perspective view of the adjustable radial arm apparatus of the present invention.

FIG. 1 shows the novel adjustable radial arm apparatus 10 mounted to, for example, a workbench 12. A workpiece 14, shown as a flat board of wood, is also positioned on the workbench 12 beneath the apparatus 10.

Figure 2:
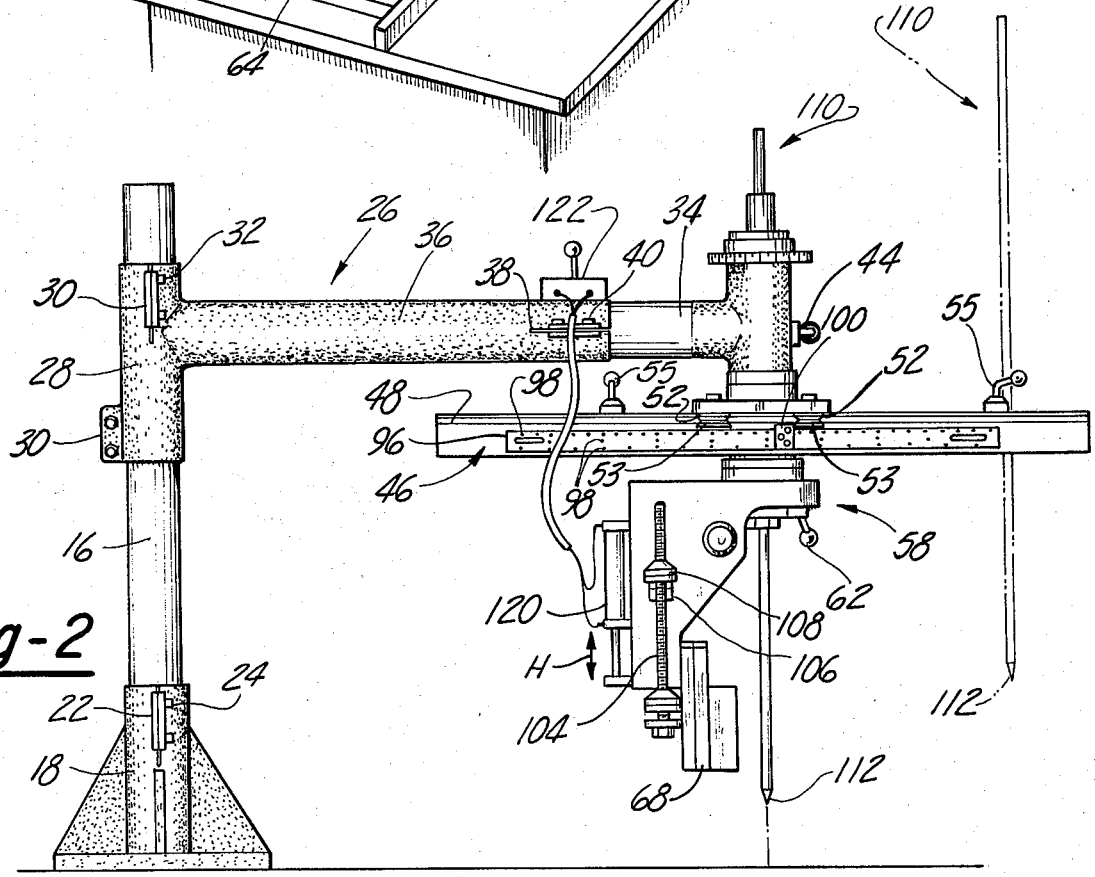
FIG. 2 is a side view of a portion of the apparatus of FIG. 1.
Figure 4:
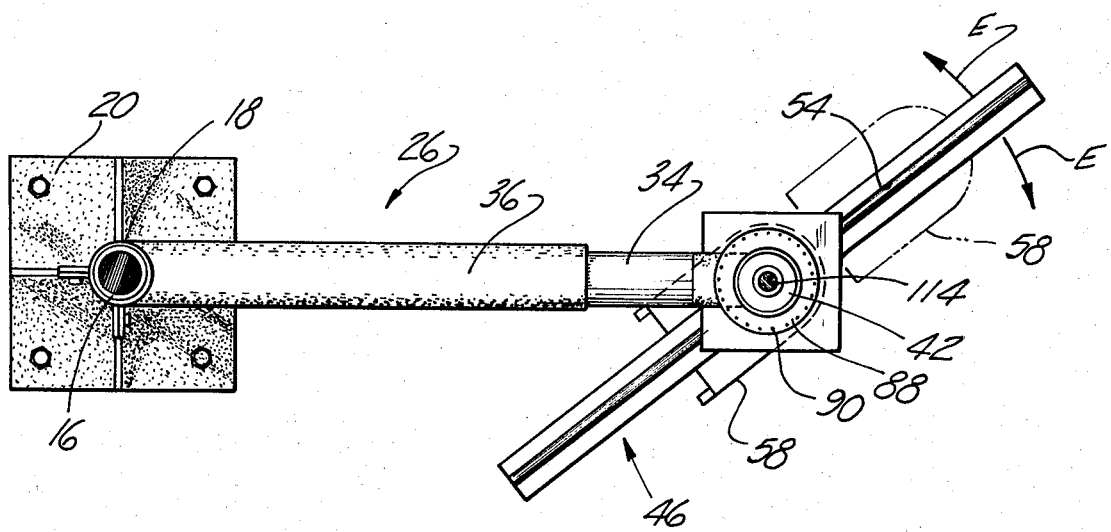
FIG. 4 is a top view of a portion of the apparatus of FIG. 1.

Referring particularly to FIGS. 1, 2 and 4, the adjustable radial arm apparatus 10 comprises a vertical column 16 secured to the workbench 12 by means of a base plate 18. The column 16 may be tightly connected to the base plate 18 by a split collar 22 which is tightened by bolts 24.

A telescopic radial arm 26 is attached at its proximal end to the column 16 for selective perpendicular linear movement along the longitudinal axis of the column 16 (indicated in FIG. 1 by the arrow A) and also for selective rotational movement in the horizontal plane about the same axis (indicated in FIG. 1 by the arrow B) by means of a bushing 28. The bushing 28 has a slit 30 (see FIGS. 1 and 2) which is closed by means of bolts 32 so that the bushing contacts the column 16 to frictionally grip it and lock or hold the radial arm 26 at a selected location on the column 16.

The telescopic radial arm 26 includes a core member 34 axially disposed within a sleeve member core 36. The core member 34 is axially slidable in the sleeve member 36 providing a linear telescopic movement of the radial arm 26 (indicated in FIG. 1 by the arrow C) and an angular movement of the core 34 about its longitudinal axis (indicated in FIG. 1 by the arrow D). The sleeve member 36 is provided with a slit 38 at its end distal to the vertical column 16. The slit 38 is tightened by means of bolts 40 to frictionally lock the core member 34 in a selected position relative to the member 36.

A cross slide pivot head 42 having a pivotal axis generally perpendicular to the longitudinal axis of the radial arm 26 is secured to the free or distal end of the core 34 of the radial arm 26 for vertical, rotational, linear and angular movements therewith and includes a rotatable shaft 43. A pivot plate 47 is mounted to the shaft 43 and is rotatable therewith. A lock (not shown) such as a conventional clutch type lock, actuated by a handle 44 is provided to lock the cross slide pivot head from pivotal movement about its pivotal axis.

A cross slide 46 is mounted to the cross slide pivot plate 47 such that its longitudinal axis is substantially perpendicular to the pivotal axis of the cross slide pivot head 42 for vertical, rotational, linear and angular movement with the radial arm 26; for selective pivotal movement about the pivot axis of the pivot head 42; (as indicated by arrow E in FIG. 1) and for selective slidable linear movement relative to the pivot head 42 (as indicated by arrow F in FIG. 1), in the direction of its longitudinal axis. The means for mounting of the cross slide 46 to the pivot plate 47 consists of two bearing rails 48 extending along opposite longitudinal sides of the cross slide 46 and two pairs of rollers 50, 52 connected to the pivot plate 47. The rollers 50, 52 have peripheral grooves 51, 53, respectively. The grooves 51 and 53 in the rollers 50 and 52 engage the bearing rails 48 on opposite sides of the cross slide 46, thus, allowing the cross slide 46 to move linearly in the direction of its longitudinal axis and to support the cross slide 46 on the pivot head 42.

Because the cross slide 46 is mounted to the pivot plate 47 for movement therewith and for independent linear movement in the direction of its longitudinal axis, the cross slide 46 is rotatable in the directions indicated in FIG. 1 by arrows B, D and E and movable linearly in directions indicated in FIG. 1 by arrows A, C, and F.

The cross slide 46 also includes a top longitudinal channel 54 therethrough and stops 55 are selectively positionable in the channel 54 to limit movement of the cross slide 46.

In some embodiments the cross slide 46 is mounted to the shaft 43 with the pivot plate 47 mounted below the cross slide 46. In other embodiments the cross slide 46 is eliminated.

A lock, (not shown) such as a conventional clutch type lock which engages in the channel 54 is actuated by a handle 56 to lock the cross slide 46 at a desired position relative to the cross slide pivot head 42.

A rotatable head 58 is fastened to the cross slide 46 for vertical, rotational, linear and angular movement with the radial arm 26; for pivotal movement about the pivotal axis of the pivot head 42 with the cross slide 46; for linear movement with the cross slide 46; and for rotational movement relative to the cross slide 46 about an axis substantially perpendicular to the longitudinal axis of the cross slide 46. Thus, the rotatable head 58 is rotatable in the directions indicated in FIG. 1 by arrows B, D, E and G and movable linearly in the directions indicated in FIG. 1 by arrows A, C and F. The head 58 can be mounted to the cross slide 46 in linear positions other than the positions shown in the drawings.

An adjustable stop means 60 is provided to stop the rotatable head 58 at desired positions relative to the cross slide 46. Lock means 62 (FIG. 2) are provided to lock the head 58 in a desired rotated position.

A swivel slide block 64 comprising a swivel block 66 and a slide plate 68 is mounted to the rotatable head 58 for vertical, rotational, linear and angular movement with the radial arm 26; for pivotal movement about the pivotal axis of the pivot head 42 with the cross slide 46; for linear movement with the cross slide 46; for rotational movement relative to the cross slide 46 with the rotatable head 58; and for selective pivotal movement relative to the rotatable head 58 about an axis generally perpendicular to the axis of rotation of the rotatable head 58 (as indicated by arrow H in FIG. 1) generally parallel to the axis of rotation of the rotatable head 58. The slide plate 68 is connected to a shaft 70 which is disposed to move axially in a bearing 72 attached to the rotatable head 58. The shaft moves linearly in a direction substantially parallel to the axis of rotation of the rotatable head 58, (as indicated in FIG. 1 by arrow H), thus, moving the swivel slide block 64 with it as it moves. The swivel block 66 is pivotally mounted to the slide plate 68 by a shaft or axle (not shown) which is received through an appropriate aperture in the slide plate 68. The axis of the shaft, and thus the pivotal axis of the swivel block 66, is disposed substantially perpendicular to its linear direction of movement of the swivel slide block 64 so that the swivel block 66 pivots in a direction indicated by arrow J in FIG. 1.

Thus, the swivel block 66 is rotatable in the directions indicated in FIG. 1 by arrows B, D, E, G and J and movable linearly in the directions indicated in FIG. 1 by arrows A, C. F and H.

A locking means, (not shown), such as a conventional clutch-type lock is functionally associated with the swivel block assembly 64 and is activated by a handle 74.

A cutting tool 76 is removably connected to the swivel block 66 by, for example, straps 78 to move with the swivel block 66. Therefore, the cutting tool has three degrees of freedom of movement.

Figure 3:
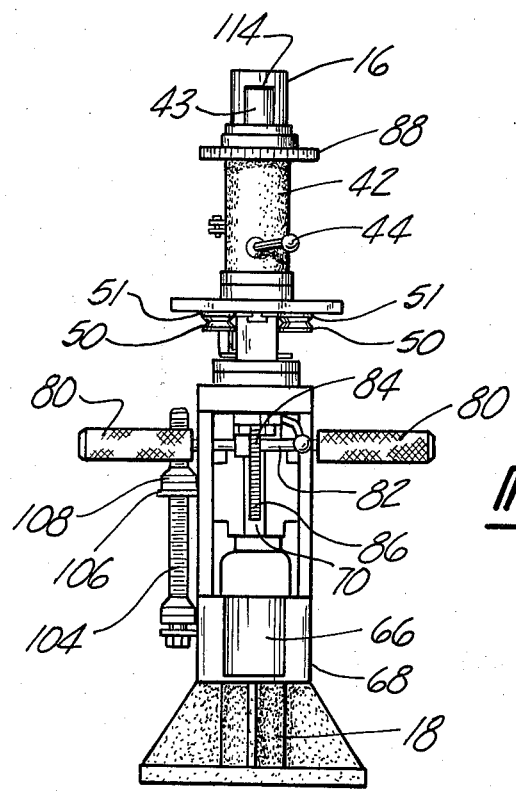
FIG. 3 is a front view of a portion of the apparatus of FIG. 1 with a cross slide removed.

With reference to FIGS. 1 and 3, the shaft 70, and thus the cutting tool 76, is moved axially in the direction indicated by arrow H by manipulating handles 80 which project from the rotatable head 58, in a direction indicated by arrow J, to feed or retract the cutting tool 76 to or from the workpiece 14. The handles 80 are interconnected by a shaft 82 (FIG. 3) having a gear 84 connected approximately at its center. The gear 84 rotates with the shaft 82. A gear rack 86 is connected to the shaft 70 along its longitudinal axis such that the teeth of the rack 86 mesh with the teeth of the gear 84.

As the gear 84 is rotated by manipulating the handles 80, the teeth of the gear 84 engage the teeth of the rack 86. Because the gear 84 is stationary, the rack 86 is caused to move, thus, causing the shaft 70 to which it is connected, to move in the direction of the longitudinal axis of the shaft 70 (see arrow H in FIG. 1) either toward or away from the workpiece 14 depending on the direction of rotation of the gear 84. As the shaft 70 moves it carries the swivel head 66 and cutting tool 76 with it.

Locking means 8 is provided to lock the slide plate 68 and the shaft 70 in a desired axial position.

Alternatively, the handles 80, gear 84 and rack 86 could be replaced by a double acting air or hydraulic fluid actuated cylinder 120 (FIG. 2) operable by control valve 122 and having its piston rod connected to the backing plate 68 to move the swivel head 66 and router 78 in the direction of arrow H. Such a cylinder 120 can be hydraulically connected to the control valve 122 conveniently located to the operator of the apparatus 10, for example, on top of the telescopic radial arm 26.

Again referring to FIGS. 1 and 2, first detent means such as a circular plate 88, having an array of detents 90 at intervals about its perimeter, is connected with the cross slide pivot head 42 to remain stationary while the cross slide 46 pivots about the pivotal axis of the pivot head 42. A resilient pin 92 is connected to the cross slide pivot head 42 for rotation therewith to engage in different detents 90 as the cross slide 46 pivots. The spacing between the detents 90 correspond to various arcs of movement of the cross slide 46 so that an operator of the apparatus 10 can feel and hear the pin 92 engaging successive detents 90 as he pivots the cross slide 46. This provides the operator with an indication of the arc through which the cross slide 46 is being moved without the need to take his eyes from the workpiece 14 being cut.

A first scale 94 is also provided around the periphery of the stationary circular plate 88 to provide the operator with a means of direct reading the arc through which the cross slide 46 is moved.

Second detent means, such as an elongated plate 96 having a plurality of parallel rows of successive detents 98, (see FIG. 2) is connected to one side of the cross slide 46 for movement therewith. The spacing between successive detents 98 in each of the parallel rows is different. For example, the spacing between the detents 98 in the top row of detents 98 may be one inch, the spacing between detents 98 in the middle row of detents 98 may be four inches, and the spacing between detents 98 in the bottom row may be two inches. A resilient pin 100 is connected to the cross slide pivot head 42 and is adjustable to engage the detents 98 in the different rows of detents. As the cross slide 46 is moved in the direction of its longitudinal axis, the pin 100 engages successive detents 98 in one row of detention in the elongated plate 96. As the pin 100 engages different detents 98, it provides the operator with a feel and sound indicating the linear distance through which the cross slide has moved without the need for the operator to take his eyes from the workpiece 14.

A second scale 102 is provided along a longitudinal side of the cross slide 46, see FIG. 1, so that the operator can make a direct reading of the distance through which the cross slide 46 is moved.

With reference to FIG. 2, a feed control means comprising an elongated scaled depth gage 104 is connected proximate one of its ends to the movable slide plate 68 for movement therewith. The elongated feed depth gage 104 extends upwardly parallel to the axis of the shaft 70 next to the rotatable head 58. An abutment 106 is connected to the rotatable head 58 adjacent the depth gage 104 and a stop 108 is adjustably mounted on the depth gage 104 for selected movement along the longitudinal axis of the depth gage 104. The distance that the cutting tool 76 can be moved toward the workpiece 14 can be controlled by moving the stop 108 to a position on the depth gage 104 corresponding to the desired distance of movement of the cutting tool 76. When the cutting tool 76 has been moved this distance by manipulating the handles 80, the stop 108 contacts the abutment 106 and prevents further movement of the cutting tool 76.

In order to properly orient the cutting tool 76 and determine a datum point on the workpiece from which to make accurate measurements for future movements of the tool 76 prior to a cutting operation, a cross slide pivot head locating rod 110 is provided (see FIGS. 1 and 2). The locating rod 110 includes a point 112 at one of its ends which is to be placed over a desired point on the workpiece 14. The locating rod 110 is inserted point 112 first through an appropriate aperture 114 through the pivot head 42 concentric with the pivotal axis thereof (see FIGS. 1 and 2), and through the channel 52 in the cross slide 46, so that the point 112 is positioned immediately over the workpiece 14. The apparatus 10 is then adjusted so that the point 112 registers with a predetermined location on the workpiece 14. The apparatus 10 is then locked in this position, the locating rod 110 removed from the aperture 114 and the cutting tool 76 moved into place.

Figure 5:
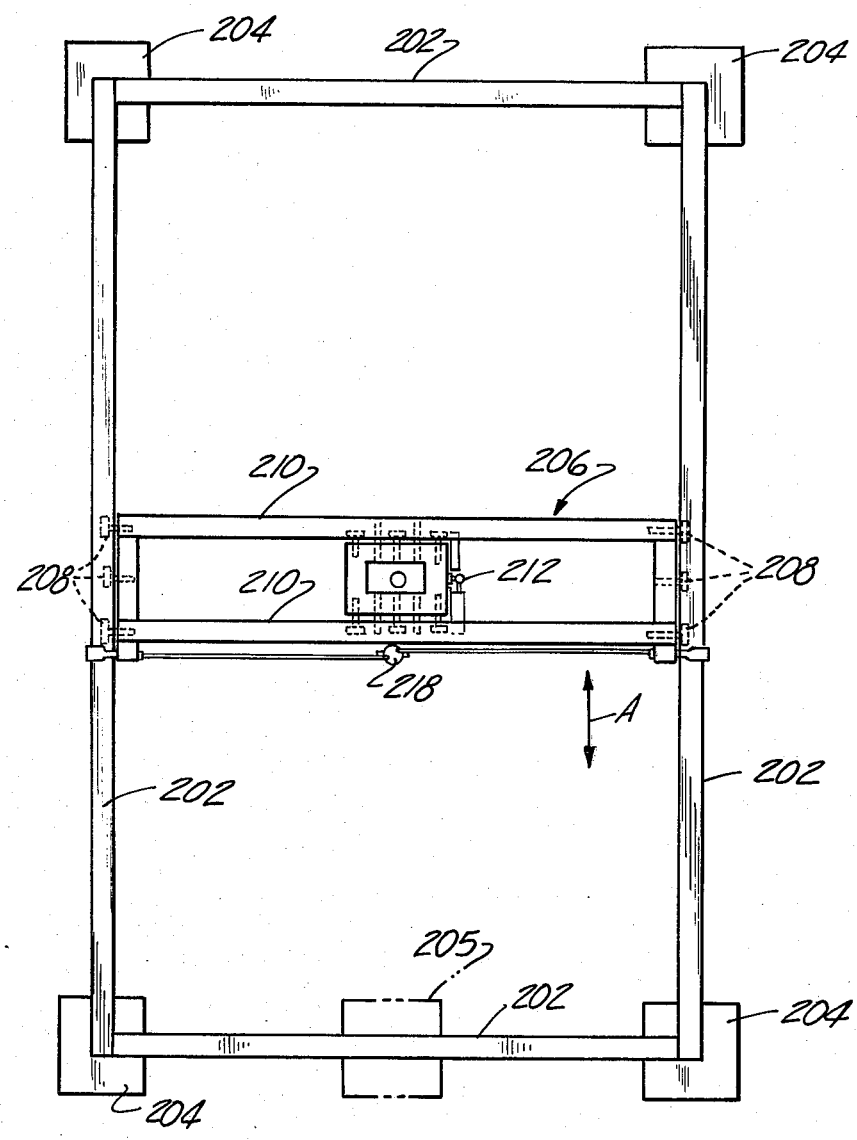
FIG. 5 is a top plan view of another preferred embodiment of the present invention.
Figure 6:
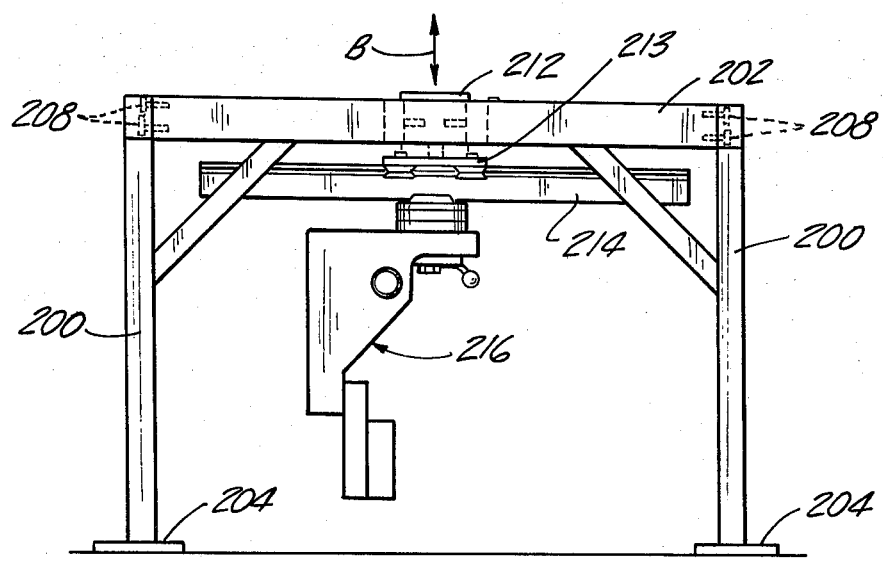
FIG. 6 is an end elevational view of the preferred embodiment shown in FIG. 5.

Another preferred embodiment of the present invention is illustrated in FIGS. 5 and 6 as comprising vertical and horizontal frame members 200 and 202 respectively joined together to form a raised rectangular frame. The vertical frame members from the legs and these can be supported by base members 204. One of the legs 205 can be spaced inwardly from the corner formed by the horizontal frame members 202 as shown in phantom in FIG. 5 to facilitate the insertion of a workpiece (not shown) beneath the horizontal frame members 200.

A cross member 206 is movably supported between a pair of the frame members 202 by wheels 208. The cross member 206 then is movable in the direction of the arrow A in FIG. 5. The cross member 206 includes a pair of spaced rail members 210 and a head 212 linearly invertable along the axis of the rail members 210. A pivot plate 213 is rotatably mounted to the head 212 to pivot about axis B in FIG. 6.

A cross slide member 214 is slidably mounted to the pivot plate 213. A swivel head 216 similar to swivel head 66 of the first embodiment and adapted to carry a cutting tool (not shown) is rotatably mounted to the cross slide member 214.

Locking means 218 are provided to lock the cross member 206 in position and stop means similar to these described with respect to the embodiment of FIGS. 1–4 can be provided to lock the cutting tool employed with the embodiment of FIGS. 5 and 6 between desired positions.

It is important to note that although I have described the two embodiments of my invention in use with a router that other cutting tools and even tools such as a scrubber or pencil could be used in place of the router illustrated.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

I claim:

1. An apparatus for selectively positioning a tool over a workpiece, comprising:

a vertically adjustable radial arm having its longitudinal axis disposed in a horizontal plane; said arm being movably secured at its proximal end for selective vertical movement and for angular rotational movement about said proximal end as an axis, and said arm comprising a sleeve member and a core member, said core member and said sleeve member being selectively linearly extendable and being selectively rotatable relative to each other about their longitudinal axis;

a cross slide pivot head secured to the distal end of said telescopic radial arm for linear vertical, linear horizontal, vertical plane rotational, and horizontal plane angular movement therewith, said pivot head having a pivot axis disposed generally perpendicular to the longitudinal axis of said core member and said sleeve member;

a rotatable head secured to said pivot head for all said linear, rotational, and angular movements therewith and for rotational movement relative to said head about an axis generally parallel to said pivot head axis;

a swivel slide block secured to said rotatable head for all the foregoing movements therewith, and wherein a first portion of said block is mounted for linear movement relative to said rotatable head in a direction generally parallel to said rotatable head axis and a second portion is mounted for pivotable movement about an axis generally perpendicular to said rotatable head axis; and wherein said second portion is adapted to hold said tool;

an elongated cross slide secured to said pivot head for linear vertical, linear horizontal, vertical plane rotational and horizontal plane angular movement therewith for rotational movement about the pivot head axis; and for slidable linear movement relative to and perpendicular to said pivot head axis;

feed means operatively associate with said swivel slide block to effect said linear movement of said swivel slide block;

adjustable feed control means operatively interconnecting said swivel slide block and said rotatable head to effect said linear movement of said swivel slide block relative to said rotatable head;

feed control means comprising an elongated depth gage connected to said swivel slide block such that the longitudinal axis of said gage is disposed substantially parallel to the direction of linear movement of said swivel block slide, said gage projecting from said swivel slide block next to said rotatable head;

adjustable stops operatively associated with said gage;

an abutment attached to said rotatable head; said abutment and said stops coacting to limit linear movement of said swivel slide block;

a hollow locating aperture located through said cross slide pivot head concentric with the pivotal axis of said pivot head; and a cross slide pivot head locating rod adapted to be removably inserted through said locating aperture, and wherein said locating rod is used to properly orient the pivotal axis of said cross slide pivot head with respect to the workpiece.

2. An apparatus for selectively positioning a tool over a workpiece, comprising:

a vertically adjustable radial arm having its longitudinal axis disposed in a horizontal plane; said arm being movably secured at its proximal end for selective vertical movement and for angular rotational movement about said proximal end as an axis, and said arm comprising a sleeve member and a core member, said core member and said sleeve member being selectively linearly extendable and being selectively rotatable relative to each other about their longitudinal axis;

a cross slide pivot head secured to the distal end of said telescopic radial arm for linear vertical, linear horizontal, vertical plane rotational, and horizontal plane angular movement therewith, said pivot head having a pivot axis disposed generally perpendicular to the longitudinal axis of said core member and said sleeve member;

a rotatable head secured to said pivot head for all said linear, rotational, and angular movements therewith and for rotational movement relative to said head about an axis generally parallel to said pivot head axis;

a swivel slide block secured to said rotatable head for all the foregoing movements therewith, and wherein a first portion of said block is mounted for linear movement relative to said rotatable head in a direction generally parallel to said rotatable head axis and a second portion is mounted for pivotable movement about an axis generally perpendicular to said rotatable head axis; and wherein said second portion is adapted to hold said tool;

an elongated cross slide secured to said pivot head for linear vertical, linear horizontal, vertical plane rotational and horizontal plane angular movement therewith for rotational movement about the pivot head axis; and for slidable linear movement relative to and perpendicular to said pivot head axis;

a hollow locating aperture located through said cross slide pivot head concentric with the pivotal axis of said pivot head; and a cross slide pivot head locating rod adapted to be removably inserted through said locating aperture, and wherein said locating rod is used to properly orient the pivotal axis of said cross slide pivot head with respect to the workpiece.

3. An apparatus as defined in claim 2 and including selectively positionable stop members for stopping movement of said cross slide and said pivot head in desired positions.

4. An apparatus as defined in claim 2 and further comprising:

a vertical column, said proximal end of said radial arm being secured to said column.

5. An apparatus as defined in claim 2 and further comprising:

first locking means for selectively holding said radial arm at a predetermined vertical location;

second locking means for selectively preventing said linear extension and said rotation of said core and sleeve relative to each other;

third locking means for selectively preventing said cross slide pivot head from rotational movement about said pivot shaft;

fourth locking means for selectively preventing said slidable linear movement of said cross slide;

fifth locking means for selectively preventing said rotational movement of said rotatable head relative to said elongated cross slide;

sixth locking means for selectively preventing said linear movement of said swivel slide block relative to said rotatable head; and seventh locking means for selectively preventing said pivotable movement of said swivel slide block relative to said rotatable head.

6. An apparatus as defined in claim 2 and further comprising:

first detent means operatively associated with said cross slide pivot head for indicating the arc through which said pivot head has been moved about said pivot head axis; and second detent means operatively associated with said cross slide for indicating the linear distance which said cross slide has been moved relative to said pivot head axis.

7. An apparatus as defined in claim 2 and further comprising feed means operatively associated with said swivel slide block to effect said linear movement of said swivel slide block.

8. An apparatus as defined in claim 6 and wherein said swivel slide block comprises:

a slide block as said first portion, said slide block being secured to said rotatable head;

a swivel block as said second portion; and a shaft joining said slide block and said swivel block and defining said axis of rotation of said swivel block.

9. An apparatus as defined in claim 7 wherein said feed means comprises:

a gear rack positioned parallel to said rotatable head axis; and a gear rotatably mounted to said rotatable head, the teeth of said gear operatively meshing with the teeth of said gear rack.

10. An apparatus as defined in claim 7 and further comprising adjustable feed control means operatively interconnecting said swivel slide block and said rotatable head to effect said linear movement of said swivel slide block relative to said rotatable head.

11. An apparatus as defined in claim 10, wherein said feed control means comprises:

an elongated depth gage connected to said said swivel slide block such that the longitudinal axis of said gage is disposed substantially parallel to the direction of linear movement of said swivel block slide, said gage projecting from said swivel slide block next to said rotatable head;

adjustable stops operatively associated with said gage;

an abutment attached to said rotatable head; said abutment and said stops coacting to limit linear movement of said swivel slide block.

12. An apparatus as defined in claim 11 and further comprising:

first indicia means connected to said cross slide pivot head for determining the arc through which said cross slide pivot head has been moved about its pivotal axis;

second indicia means connected to said cross slide for determining the linear distance said cross slide has moved relative to said pivot head.

* * * * *

UNITED STATES PATENT OFFICE
CERTIFICATE OF CORRECTION

PATENT NO. : 3,923,086
DATED : December 2, 1975
INVENTOR(S) : Daniel M. Spohn

It is certified that error appears in the above-identified patent and that said Letters Patent are hereby corrected as shown below:

Col. 6, line 39, after "members" insert --200-- line 39, delete "from" and insert --form--.

Signed and Sealed this thirtieth Day of March 1976

[SEAL]

Attest:

RUTH C. MASON
Attesting Officer

C. MARSHALL DANN
Commissioner of Patents and Trademarks